(12) United States Patent
Abdel-Maksoud et al.

(10) Patent No.: US 7,160,161 B2
(45) Date of Patent: Jan. 9, 2007

(54) REDUCED PRESSURE MIXING DEVICE FOR MARINE VESSEL EXHAUST GAS

(75) Inventors: Moustafa Abdel-Maksoud, Berlin (DE); Hannes Schulze Horn, Gladbeck (DE); Kay Tigges, Harsefeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/056,251

(22) Filed: Feb. 14, 2005

(65) Prior Publication Data

US 2005/0215133 A1 Sep. 29, 2005

(30) Foreign Application Priority Data

Mar. 29, 2004 (DE) .................. 10 2004 015 794

(51) Int. Cl.
*B63H 21/32* (2006.01)
(52) U.S. Cl. .................................... 440/89 B
(58) Field of Classification Search .............. 440/89 A, 440/89 B, 89 C
See application file for complete search history.

(56) References Cited

U.S. PATENT DOCUMENTS 3,084,651 A 4/1963 Parmenter
4,631,032 A 12/1986 Nishida
4,979,917 A 12/1990 Haynes
5,740,670 A * 4/1998 Woods .................. 60/310
2003/0119388 A1 6/2003 Hauschildt

FOREIGN PATENT DOCUMENTS

DE    102 24 013 A1    12/2003
GB    1 323 871         7/1973
JP    2001-39995 A      9/2001

* cited by examiner

*Primary Examiner*—Jesús D. Sotelo
(74) *Attorney, Agent, or Firm*—Harness, Dickey & Pierce, P.L.C.

(57) ABSTRACT

A reduced pressure mixing device is for marine vessel exhaust gas with water, with the gas/water mixture that is produced in the device being passed out into the water in which the ship is floating. The device is designed such that gas and water flow through and to it longitudinally. Further, the device includes a centrally-arranged gas guide tube for the marine vessel exhaust gas as well as a propulsion water tube which is arranged coaxially around the gas guide tube and produces reduced pressure, with the tubes being located in an elongated housing.

27 Claims, 4 Drawing Sheets

REDUCED PRESSURE MIXING DEVICE FOR MARINE VESSEL EXHAUST GAS

The present application hereby claims priority under 35 U.S.C. §119 on German patent application number DE 10 2004 015 794.4 filed Mar. 29, 2004, the entire contents of which are hereby incorporated herein by reference.

BACKGROUND OF THE INVENTION

A considerable amount of power in the form of internal combustion engines is installed on large, sea-going marine vessels. This not only includes navy marine vessels such as frigates and corvettes, etc. or large yachts, but also includes ferries, etc. These internal combustion engines produce a considerable amount of exhaust gas which is blown into the atmosphere. Not only in the case of merchant marine vessels but also in many navy marine vessels, this is generally done upwards and leads to a not inconsiderable disturbing exhaust gas plume. This can be seen for miles across the sea, and can even be detected by infrared beyond the radar horizon (location).

In order to reduce the visual impact and the capability to locate the exhaust gas plume or to avoid this, some navy marine vessels normally emit the exhaust gases slightly above the waterline, for example at the side, or slightly below the waterline, and in this case preferably at the stern. However, even the latter measure does not lead to sufficiently good mixing of the exhaust gases with the water that it would not be possible to locate the exhaust gases as they rise from the gas bubbles that are formed.

SUMMARY OF THE INVENTION

One object of an embodiment of the invention is to specify a device which allows the exhaust gas from marine vessels of a not inconsiderable size to be emitted in a mixed form under the water, with bubble formation in this case reliably being reduced or even prevented and also being operable with relatively large volume flows and at considerable introduction depths of up to 5 meters as well as when the marine vessel is stationary. The aim of one embodiment is thus to allow the exhaust gases to be introduced not only on the high seas but also in harbors, without any exhaust gas plume being formed or any exhaust gas layer being formed on the water surface.

Furthermore, the device is intended to operate in such a way that the emission of the exhaust gases under water does not result either in performance reduction, but in fact may even result in a performance increase as a result of the reduction in the exhaust gas backpressure.

A further object of an embodiment is that it should be possible to use the exhaust gases to reduce the drag on the marine vessel.

An object of an embodiment should be to introduce not only the exhaust gas from internal combustion engines such as diesel engines, but also the exhaust gas from gas turbines as well as reformers and the exhaust air from the air-conditioning system which may be fitted.

U.S. Pat. No. 4,979,917 discloses a small watercraft which has waterjet propulsion. The jet of water which is emitted from the waterjet is used to clear an outlet channel for the exhaust gas from the waterjet drive engine, slightly below the waterline at the stern of the small watercraft, in order that the exhaust gas can emerge slightly below the water level, and in the process reduces the friction in the stern area of the small watercraft. In this case, provision is also made for the cooling water from the engine to be mixed with the jet of water from the waterjet.

This known solution admittedly reduces the stern friction of the watercraft, but the exhaust gases are introduced only at a shallow depth below the water level so that the exhaust gas reaches the water surface essentially without having been mixed, at least in the form of large bubbles. This known solution is therefore not suitable for large watercraft and for achieving a considerable reduction in the amount of smoke produced by yachts, or to avoid the detection of the exhaust gas from navy marine vessels. The stated object of an embodiment can therefore be achieved only very partially, at best.

In order to achieve an object of an embodiment of the invention, a reduced pressure mixing device is provided for mixing the marine vessel exhaust gas with water. The device is designed such that gas and water flow through and to it longitudinally. It includes a centrally-arranged gas guide tube for the marine vessel exhaust gas, as well as a water tube which is arranged coaxially around the gas guide tube and produces reduced pressure, with the tubes being located in an elongated housing.

The design of the device for introduction of the exhaust gas into the water in the form of a mixing device and not only as a device which also achieves mixing at the same time, results, together with the specific production of reduced pressure and the position (which has been exchanged for that of an ejector) and exchanged introduction of exhaust gas and water, in a device which can completely achieve the object. JP-2001239995 A discloses one example of ejectors which are known as being typical for maritime purposes but provide inadequate mixing in practice.

One refinement of an embodiment of the invention provides that the water tube has an area with a cross section which is smaller than the incident flow cross section, in order to produce a reduced pressure, and that the area with the smaller cross section is in the form of an annular space. This relatively complex configuration not only makes it possible to produce a reduced pressure but also allows this reduced pressure to act on the exhaust gas jet from the outside. This results in a considerably better mixing and emission effect than in the case of the prior art which is further reinforced by the reduced pressure in the waterjet.

An embodiment of the invention also provides for a swirl-producing device, for example swirl blades, to be arranged in the area of the propulsion water tube with the smaller cross section. This advantageously even further increases the mixing effect by use of the propulsion water jet.

A further refinement of an embodiment of the invention provides that a gas displacement body is arranged centrally in the gas guide tube, preferably in the area of the propulsion water annular space, with an annular space for the gas likewise being formed around the gas displacement body. This results in a highly advantageous increase in the surface area of the gas jet, which, particularly when the gas jet is also caused to swirl, for example by the use of swirl blades, leads to previously unachieved good mixing of the exhaust gas with the water.

It is particularly advantageous in this case for the respective swirl-producing device for the gas and water to be arranged such that they act in opposite directions. Overall, this reliably makes it impossible for gas bubbles to be formed, which emit gas in a form not mixed with water. This prevents the formation of an exhaust gas streak on the water surface and very largely prevents the capability to detect the exhaust gases. The exhaust gases are generally dissolved in the water before the small and very small gas bubbles that are formed reach the surface. This reliably avoids not only soot emission, but also smoke emission as is important, for example, for yachts.

The annular spaces for the gas and propulsion water which are fitted with swirl-producing device(s) are followed by an annular mixing area in the tubular outer container of the device, which is followed by an exhaust gas/water mixture outlet tube. This part of the emission device also acts as a diffusor, so that the emerging water is brought back, even at relatively great depths, to the pressure conditions in the water in which it is ejected. The diffusor is in this case an integrated component of the mixture outlet tube. This part of the mixture outlet tube no longer needs to be a round cross section since there is no longer any need to provide a swirling effect here. The cross sections in this area may thus also be rectangular, thus making it possible to distribute the gas/water mixture, for example, under the bottom of the marine vessel or on the outer wall of the marine vessel. This makes it possible to achieve a considerable reduction in the friction on the outer wall of the marine vessel.

One particularly simple embodiment, which is particularly suitable for large-scale production provides for the device to have a cylindrical casing tube whose diameter corresponds in particular to the diameter of the water tube. It is thus highly advantageously possible to produce standard devices in which only the inlet and outlet openings need be matched to the respective fittings on the marine vessel in which they are used.

One refinement of an embodiment of the invention, provides for a controllable, in particular electrically driven, propulsion water pump to be arranged in front of the water tube. The amount of water required for emission can thus always be produced without having to take as much power from the onboard power supply system, from which, for example, the propulsion water pump draws its power.

It is particularly advantageous for an exhaust gas cooling apparatus, in particular, an exhaust gas cooling apparatus which operates with water injection, to be arranged in front of the exhaust gas guide tube, that is to say in the area of the exhaust gas inlet into the device. This advantageously considerably reduces the exhaust gas volume, and decreases the thermal stress on the device.

The device according to an embodiment of the invention can be used for small and large internal combustion engines. However, it is particularly advantageous for it to be used for the introduction of the exhaust gases into the water from internal combustion engines which are arranged distributed in a marine vessel with the internal combustion engines preferably being arranged underneath the waterline in order that the exhaust gas lines can be kept short. For the marine vessel in which the device is used, this thus results in a particularly advantageous capability to accommodate the internal combustion engines in an area which contains less "valuable" internal space. An installation such as this avoids the need for a large central engine bay as well as avoiding voluminous exhaust gas pipes in the valuable central area of the marine vessel. Thus, overall this results not only in an improvement in usefulness but also a gain in space for a marine vessel such as this. This is particularly advantageous for navy marine vessels where the space conditions are very confined.

One specific refinement of an embodiment of the invention provides for the device to be used for the introduction of the exhaust gases from gas turbines for propulsion by water jets, with the exhaust gas/water mixture outlet tube opening in the jet outlet area of the waterjets. Thus, if the waterjets are located in a deep position in the marine vessel, this results in a propulsion capability using waterjets in which the drive machine and overall effectiveness of the waterjets which are operating underwater can be raised to the level of waterjets operating above the water, by means of the reduced pressure area created according to an embodiment of the invention. This is achieved in a highly advantageous manner without the previously normal large machine and exhaust gas systems in the marine vessel.

It is also possible to allow the exhaust gas/water mixture outlet tube to open into a marine vessel hull bottom step. This also makes it possible to dissipate large amounts of exhaust gas, for example, from a gas turbine, without any problems and without having to restrict the capability to control the gas turbine. In fact, gas turbines are highly sensitive to back pressure.

In this context, in order to improve the controllability of the waterjets, an embodiment of the invention provides for the waterjet outlet to have a preferably telescopic outlet cross-section control apparatus. This makes it possible to produce an optimized waterjet propulsion jet speed which is harmonized with the amount of gas and water to be mixed.

The use of the device according to an embodiment of the invention is particularly advantageous when the aim is to achieve a very high degree of freedom from emissions for a navy marine vessel or a large yacht. In this case, the exhaust gases from reformers for the production of hydrogen from fuel cells as well as the air from air-conditioning systems are also introduced into a corresponding device, or a separate device is used. In any case, a marine vessel equipped with a device according to an embodiment of the invention has neither an exhaust gas plume nor a hot air plume behind it.

An object may be, in this case, advantageously achieved both for navy marine vessels and for large yachts and for high-speed ferries which require a very large amount of space below decks by accepting the increased costs and the somewhat greater amount of power required in comparison to free ejection of the exhaust gases into the air.

Particularly for the operation of the device according to an embodiment of the invention for introduction of gas turbine exhaust gases into the water, it is advantageous not to use voluminous reduced pressure mixing devices in this case, but to arrange two or more small devices in a parallel position, for example, alongside the water jet. This results in two or more reduced pressure mixing paths, which also allow optimization by connection of the respectively required reduced pressure and mixing volumes.

An embodiment of the invention provides for the propulsion of water to be extracted by an extraction apparatus for seawater, for example a sea box. Obviously, cooling water from the internal combustion engines can also be mixed with this propulsion water, so that the amount of propulsion water need not all be extracted from the water surrounding the marine vessel, thus saving energy.

The propulsion water pump is advantageously also connected to the marine vessel automation, so that its feed rate can be automatically matched to the exhaust gas volume. Since the device according to an embodiment of the invention is intended to be used in particular for internal combustion engines which are arranged below the water line of the marine vessel, the exhaust gas line is provided with non-return valves or flaps in order to reliably prevent these internal combustion engines from being flooded, with these non-return valves or flaps being designed, in particular, such that they operate automatically. This results in a safety level which is sufficiently high that it can be accepted by the classification authorities.

When the amount of propulsion water is optimized, an exhaust gas introduction depth of up to 5 to 6 meters is possible, so that the device allows gas to be emitted below the depth of normal waves. If the marine vessel has to travel through larger waves, these are so long that appropriate control is possible provided that the propulsion water pump is designed to have an adequate dynamic range. A large marine vessel provided with the devices according to the invention can thus be used without any restriction resulting from weather conditions.

BRIEF DESCRIPTION OF THE DRAWINGS

The invention will be explained in more detail with reference to exemplary embodiments in conjunction with the drawings.

In detail, in the drawing figures.

DETAILED DESCRIPTION OF THE EXEMPLARY EMBODIMENTS

Figure 1:
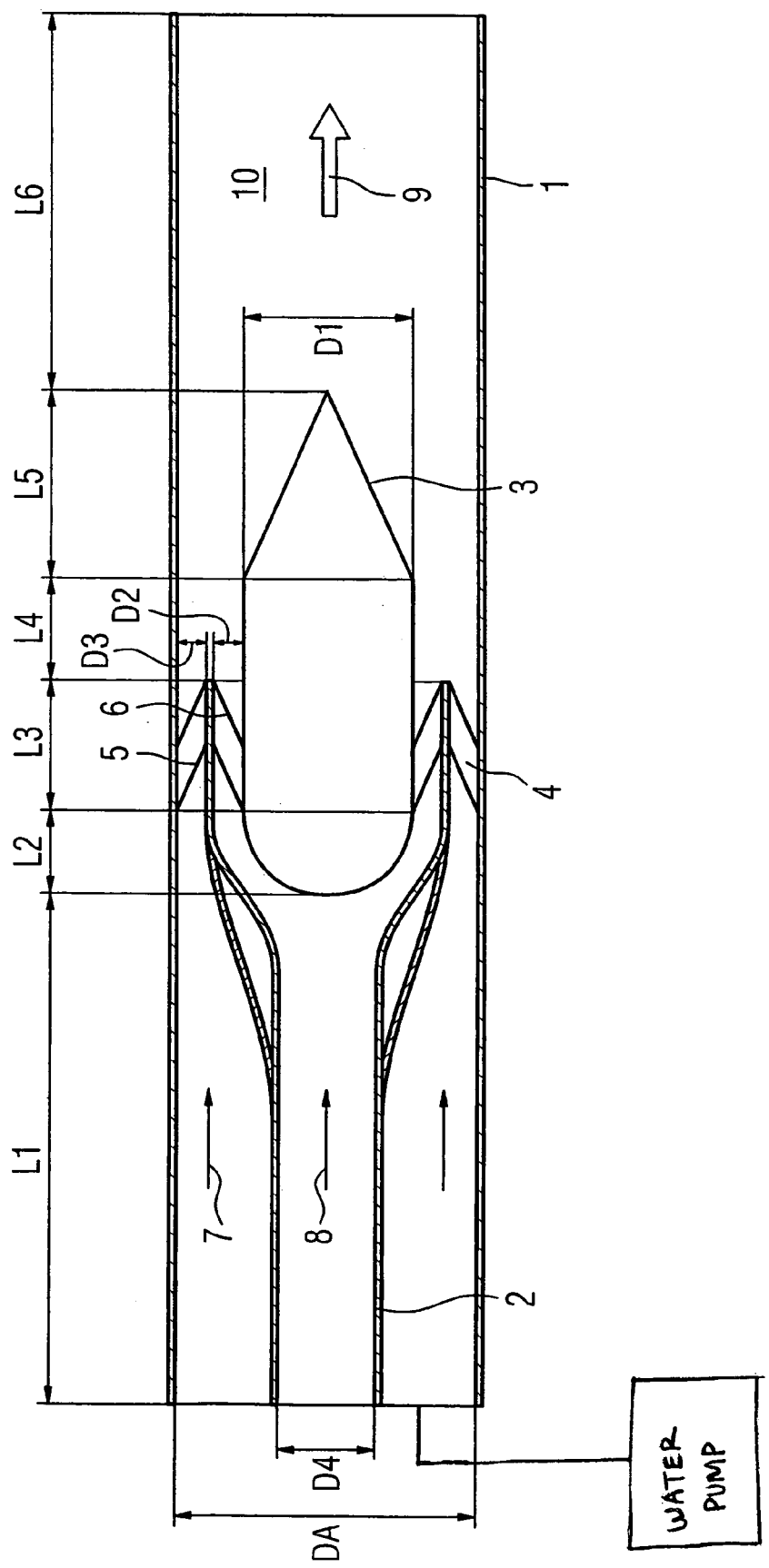
FIG. 1 shows a schematic section drawing through the device according to an embodiment of the invention.

In FIG. 1, 1 denotes the housing tube of the device, which is at the same time the introduction tube for the water for mixing and for producing the reduced pressure. Element 2 denotes the gas tube and 3 the advantageous central displacement body, which is significant to an embodiment of the invention, for gas with an outlet flow cone for the mixing process that occurs, with a diffuser effect. The reduced pressure area according to an embodiment of the invention is formed around the displacement body 3 on the outside of the widened area 4. Guide elements 5 and 6 are provided in order to introduce swirl into the water flow and into the gas flow and can at the same time form a holder for the displacement body 3 and for the widened water channel 4. The water which is supplied to the mixing and reduced pressure producing device is symbolized by the arrows 7, and the gas is symbolized by the arrow 8. The gas/water mixture that is formed is symbolized by the double arrow 9. 10 denotes the mixture outlet tube. As schematically shown in FIG. 1, a water pump can be arranged at an optional location on the intake side, in front of the central displacement body 3.

The geometrical conditions, that is to say the tube diameter and the tube section lengths in the device, are quite important for the advantageous operation of the mixing and reduced pressure producing device. For this reason, FIG. 1 shows the individual lengths and the major diameters. The relationships between the dimensions in FIG. 1 are as follows:

DA=1.5–2.0 D4
L1=3–4.5 D4
L2=0.6–0.8 D4
L3=0.8–1.2 D4
L4=0.6–1.0 D4
L5=1.3–1.7 D4
L6=1.5–3.5 D4
D1=1.2–1.5 D4
D2=0.2–0.3 D4
D3=0.2–0.3 D4

D4 is the diameter of the exhaust gas tube

The relationships quoted in the table are calculated for an exhaust gas tube with a diameter of 250 mm, into which the exhaust gases from a typical, boosted diesel engine with a power of 1300 kW are introduced. The exhaust gas inlet temperature into the device is 90° C., after it has been cooled, as provided according to an embodiment of the invention.

Figure 2:
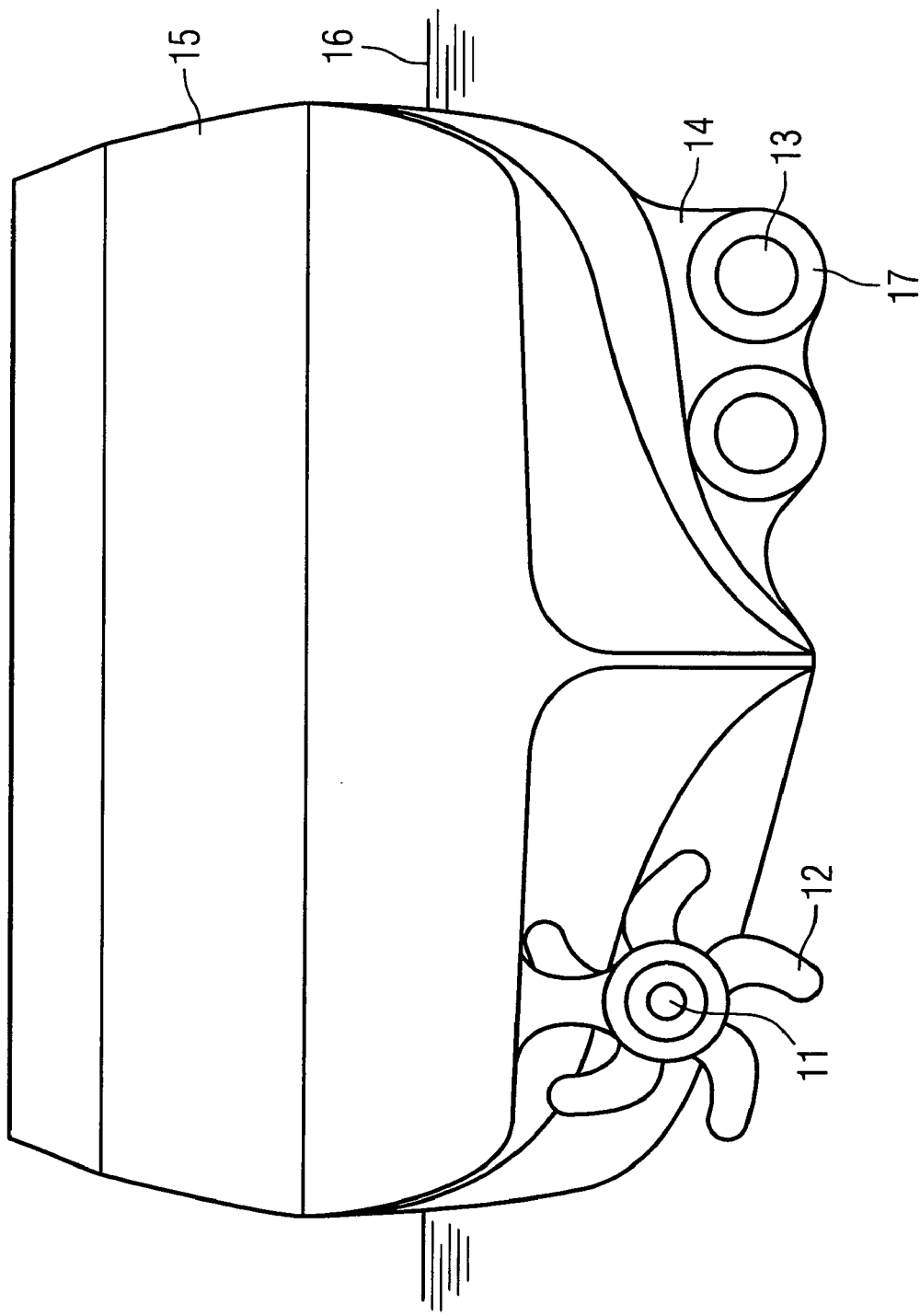
FIG. 2 shows an example of an arrangement of waterjets with a gas outlet in the jet of water.

In FIG. 2, 11 denotes the shaft of an electrical steering propeller with the propeller blade 12. A normal fixed propeller may also be used instead of an electrical steering propeller. In this case, instead of the steering propeller casing, the marine vessel has a skeg for holding an appropriate electric motor or a propeller shaft.

Figure 3:
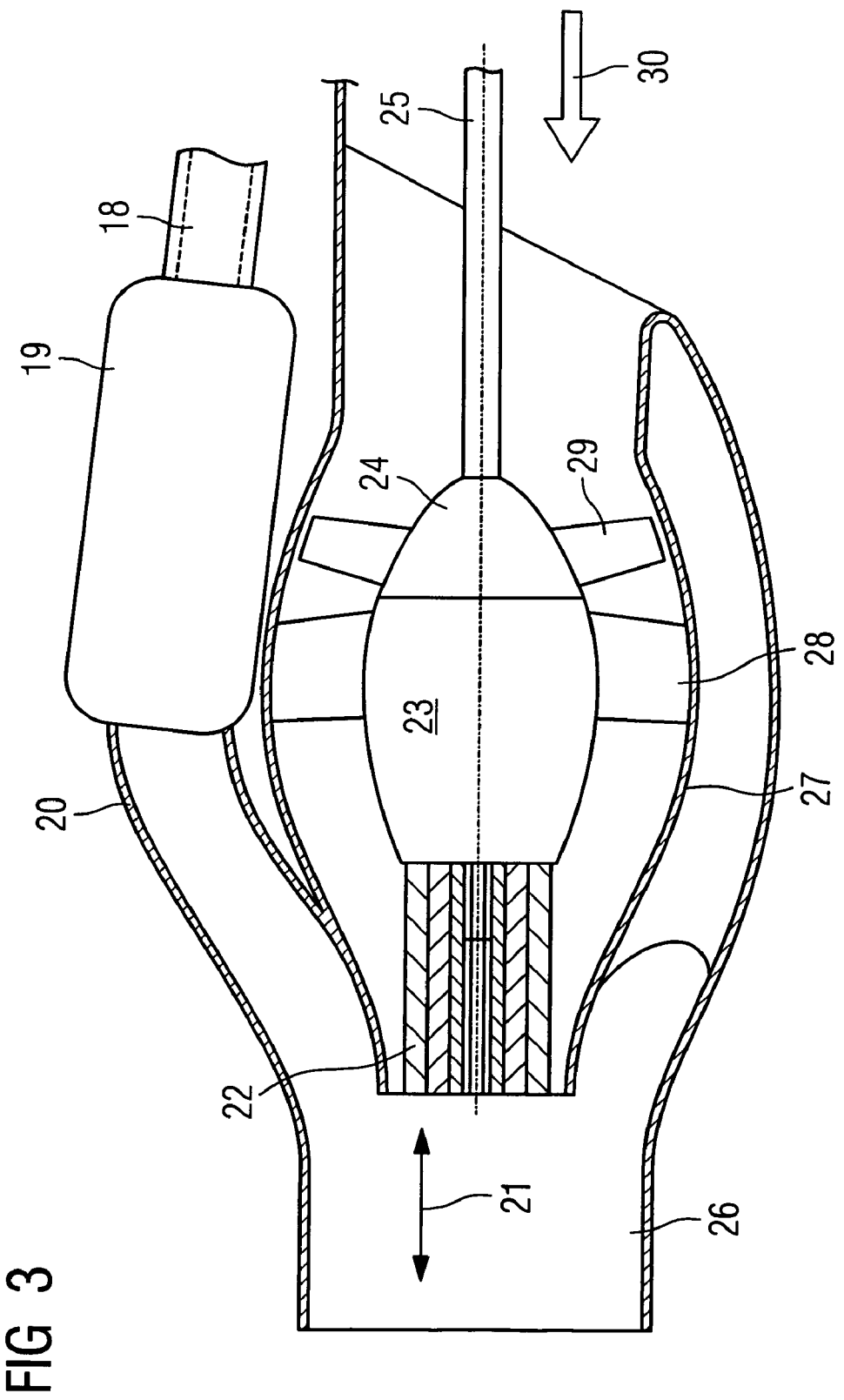
FIG. 3 shows a schematic section through a waterjet, with a device according to an embodiment of the invention parallel to it.

In FIG. 2, 13 also denotes a waterjet, and 14 the waterjet housing. An outlet flow area 17 for the exhaust gases is provided around the waterjet 13 and details of this arrangement are shown in FIG. 3. As can be seen from the water level 16 that is marked, the waterjet 13 is located with its housing 14 deep below the hull of the marine vessel 15.

The motor for the waterjet is normally arranged directly in front of the waterjet and the internal combustion engine which provides the power for the waterjet is arranged as close as possible in the area of the drive motor for the waterjet. This results in an arrangement for which ejection of the exhaust gases in the area of the waterjet housing 14 is particularly advantageous.

In FIG. 3 18 denotes the coaxial introduction tube for gas and water, and 19 the device according to an embodiment of the invention for producing reduced pressure and for mixing gas and water. 20 denotes the tube by which the mixture is emitted and 26 denotes the annular space at the outlet of the waterjet from which both the gas/water mixture and the jet of water emerge. The annular space 26 in this arrangement can advantageously have the diffusor effect, so that there is no need for the diffusor part of the device.

The waterjet itself has a rotor part 24, driven by the shaft 25, a stator part 23, and a controllable outlet nozzle with an inner part 22 which can be extended telescopically. The capability to extend the telescopic part is symbolized by the double-headed arrow 21. The blades 29 are located in the rotor part of the waterjet, and blades 28 are located on the stator part 23. These blades produce the outlet jet on the central housing part 27 and the cross section of the outlet jet can be controlled by the telescopic device 22. The water flowing in is symbolized by the arrow 30.

For illustrative purposes, individual parts are shown enlarged in the drawing, for example, the telescopic tube 22, while other parts, such as the device 19 according to an embodiment of the invention are reduced in size. The drawing is intended only for basic understanding of the arrangement of a device according to an embodiment of the invention and a waterjet.

Figure 4:
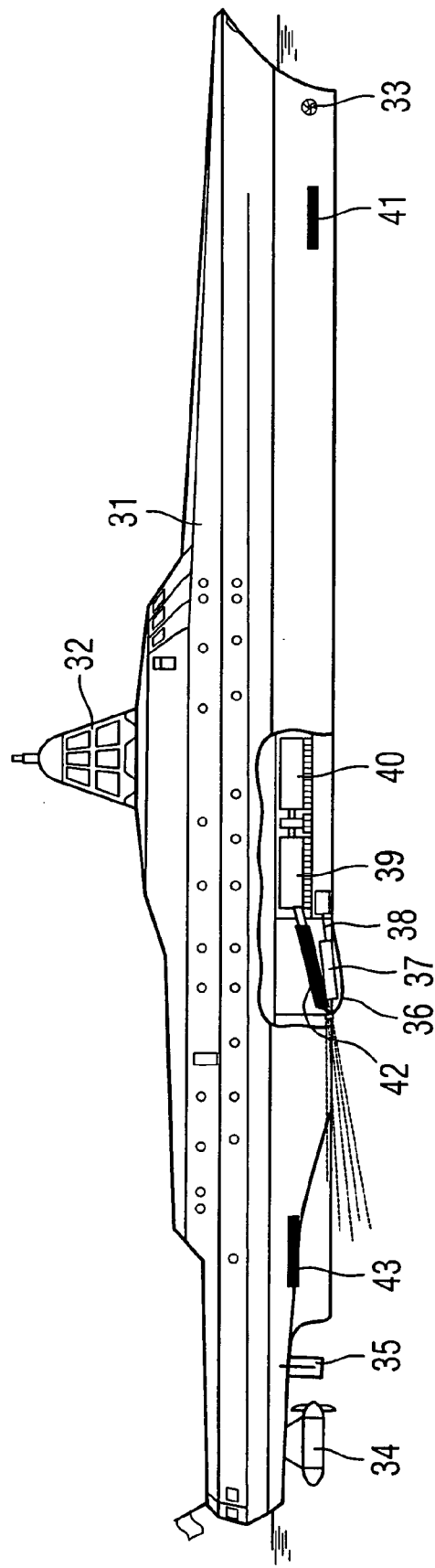
FIG. 4 shows an example of a schematic illustration of a large, sea-going marine vessel, for example a frigate, with distributed devices according to an embodiment of the invention.

In FIG. 4, 31 denotes a high-speed, sea-going marine vessel, for example a frigate. A multifunction tower 32 is indicated in the upper part of the frigate. Various devices 41, 42, 43 according to an embodiment of the invention for the emission of gas/water mixtures are located in the hull of the marine vessel, which is used by way of example.

These devices are distributed in the marine vessel and are advantageously each associated with a power generating device. This may in each case be a diesel engine or a gas turbine, with the diesel generator set 39, 40 being illustrated by way of example, or else a reformer. Hydrogen for fuel cells is produced in the reformer. The distribution highly advantageously means that a hit by a mine or a rocket can in each case deactivate only a portion of the marine vessel's power production.

The frigate which is shown by way of example is powered by a rotatable electric steering propeller 34, which supplements the waterjet 37 in its housing 36. The waterjet 37 is in this case driven by the drive shaft 38.

The exhaust gases, for example from a gas turbine generator set which may be used instead of the diesel generator set that has been mentioned are supplied to the device 42 as already stated. This is advantageously in the form of individual devices connected in parallel, in order to introduce the large amounts of gas into the waterjet modules, which are likewise connected in parallel. Furthermore the frigate which is shown by way of example also has an extendable rudder 35 and a bow thruster steering device 33. These are the maneuvering devices for a marine vessel of a size such as this, which are normally used in order to travel in a straight line in a stable manner or to allow docking maneuvers or undocking maneuvers using the vessel's own power.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A reduced pressure mixing device for mixing exhaust gas of a marine vessel with water, wherein a gas/water mixture produced in the device is for passing out into the water in which the marine vessel is floating, the device being designed such that gas and water flow through and to the device longitudinally, the device comprising:
    a centrally-arranged gas guide tube for the marine vessel exhaust gas;
    a gas displacement body arranged centrally in the gas guide tube, around which an annular space for the gas is formed;
    a water tube, arranged coaxially around the gas guide tube for producing reduced pressure, wherein the tubes are located in an elongated housing; and
    a controllable water pump, arranged in front of the water tube.

2. The device as claimed in claim 1, wherein the water tube includes an area with a cross section which is relatively smaller than an incident flow cross section, in order to produce the reduced pressure.

3. The device as claimed in claim 2, wherein the area of the water tube with the smaller cross section is in the form of an annular space.

4. The device as claimed in claim 3, wherein the annular spaces for the gas and water, which are fitted with a swirl-producing device, are followed by an annular mixing area for the gas and water, which is followed by an exhaust gas/water mixture outlet tube.

5. The device as claimed in claim 4, wherein the mixing area is followed by a diffusor which forms an exhaust gas/water mixture outlet tube.

6. The device as claimed in claim 3, further comprising: means for swirl-producing, arranged in the area of the water tube with the smaller cross section.

7. The device as claimed in claim 3, further comprising: swirl blades, arranged in the area of the water tube with the smaller cross section.

8. The device as claimed in claim 2, further comprising: means for swirl-producing, arranged in the area of the water tube with the smaller cross section.

9. The device as claimed in claim 2, further comprising: swirl blades, arranged in the area of the water tube with the smaller cross section.

10. The device as claimed in claim 1, wherein a swirl-producing device is arranged in the annular space for the gas.

11. The device as claimed in claim 10, wherein the swirl-producing device includes swirl blades, arranged to act in opposite directions.

12. The device as claimed in claim 1, wherein the device has a cylindrical casing tube whose diameter corresponds to the diameter of the water tube.

13. A method, comprising:
    introducing the exhaust gases from internal combustion engines or reformers, arranged distributed in a marine vessel, into the water using the device as claimed in claim 1, wherein the internal combustion engines or reformers are arranged underneath the waterline.

14. A method, comprising:
    introducing the exhaust gases from gas turbines for driving waterjets, arranged deep below the waterline, using the device as claimed in claim 1.

15. The method as claimed in claim 14, wherein the exhaust gas/water mixture outlet tube opens into the flow outlet area of the deeply arranged waterjets.

16. The method as claimed in claim 14, wherein the exhaust gas/water mixture outlet tube opens into a marine vessel hull bottom step.

17. The method as claimed in claim 14, wherein the waterjet outlet has a telescopic outlet cross-section control apparatus.

18. The method as claimed in claim 14, wherein the device is arranged in a position approximately parallel to the deeply arranged waterjets.

19. The method as claimed in claim 14, wherein the device has two or more reduced pressure mixing paths.

20. A method, comprising:
    suppressing, using the device as claimed in claim 1, an IR signature of navy marine vessels.

21. A method, comprising:
    introducing, using the device as claimed in claim 1, exhaust gas into the water in the case of yachts.

22. A method, comprising:
    introducing, using the device as claimed in claim 1, exhaust gas into the water in the case of high-speed ferries which are intended for the conveyance of motor vehicles.

23. A sea-going marine vessel having internal combustion engines which are distributed in the marine vessel, comprising:
    at least one device as claimed in claim 1, which allows exhaust gas to be passed out under the waterline.

24. The sea-going marine vessel as claimed in claim 23, wherein the marine vessel includes at least one seawater extraction apparatus, for extraction of propulsion water from the water surrounding the marine vessel.

25. The sea-going marine vessel as claimed in claim 23, wherein the marine vessel includes a device for supplying cooling water to the water tube.

26. The sea-going marine vessel as claimed in claim 25, wherein the controllable water pump includes an electrical drive, which is connected to the marine vessel automation.

27. A device for mixing exhaust gas of a marine vessel with water, the device comprising:
a gas guide tube for the exhaust gas;
a water tube arranged coaxially around the gas guide tube, the water tube and the gas guide tube being fixed together; and
a gas displacement body arranged in the gas guide tube, such that an annular space for the exhaust gas is defined between the gas displacement body and the gas guide tube.

* * * * *